(12) United States Patent
Devireddy et al.

(10) Patent No.: US 10,372,464 B2
(45) Date of Patent: Aug. 6, 2019

(54) PROVISIONING THE HYPER-CONVERGED INFRASTRUCTURE BARE METAL SYSTEMS FROM THE TOP OF THE RACK SWITCH

(71) Applicant: HGST Netherlands B.V., Amsterdam (NL)

(72) Inventors: Kishore K. R. Devireddy, San Jose, CA (US); John J. Glen, Sunnyvale, CA (US); Venkatanarasimhan K. Ramakrishnan, Fremont, CA (US); Justin R. Unger, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 154 days.

(21) Appl. No.: 15/189,901

(22) Filed: Jun. 22, 2016

(65) Prior Publication Data

US 2017/0371683 A1    Dec. 28, 2017

(51) Int. Cl.
| | |
|---|---|
| *G06F 9/00* | (2006.01) |
| *G06F 9/24* | (2006.01) |
| *G06F 15/177* | (2006.01) |
| *G06F 9/4401* | (2018.01) |
| *G06F 8/61* | (2018.01) |

(Continued)

(52) U.S. Cl.
CPC ............. *G06F 9/4416* (2013.01); *G06F 8/63* (2013.01); *G06F 9/4406* (2013.01); *G06F 9/45541* (2013.01); *H04L 41/0809* (2013.01); *H04L 41/12* (2013.01); *H04L 61/2015* (2013.01);

(Continued)

(58) Field of Classification Search
CPC ..................................................... G06F 9/4416
See application file for complete search history.

(56) References Cited

U.S. PATENT DOCUMENTS

| | | | |
|---|---|---|---|
| 2006/0168196 A1* | 7/2006 | Herbert | G06F 8/61 709/224 |
| 2008/0082809 A1* | 4/2008 | Rothman | G06F 9/4416 713/1 |

(Continued)

OTHER PUBLICATIONS

Huwwei FusionSphere 5.1; Technical White Paper on Physical Bare-Metal Server; Issue V1.0; Release Date Apr. 5, 2015; 12 Pages.

(Continued)

*Primary Examiner* — Mohammed H Rehman
(74) *Attorney, Agent, or Firm* — Patent Law Works LLP

(57) ABSTRACT

Methods and devices for provisioning a hyper-converged infrastructure of bare metal systems are disclosed herein. Two fabric elements are configured in a master-slave arrangement to ensure high availability. ONIE capable fabric elements may be pre-installed with an operating system as firmware to run open network operating systems, such as Linux. The Linux operating system includes a KVM hypervisor to run virtual machines. An operating system of the virtual machines can access an external network by creating a bridge between switch management ports and a virtual network interface. New node elements may be added by connecting the network ports of the new node element to the fabric elements and booting the new node element in a network/PXE boot mode. The new node element obtains an IP address from a DHCP server and boots an image downloaded from a PXE server.

20 Claims, 5 Drawing Sheets

(51) Int. Cl.
*G06F 9/455* (2018.01)
*H04L 12/24* (2006.01)
*H04L 29/12* (2006.01)

(52) U.S. Cl.
CPC ...... *H04L 61/2038* (2013.01); *H04L 61/3095* (2013.01)

(56) References Cited

U.S. PATENT DOCUMENTS

| | | | | |
|---|---|---|---|---|
| 2010/0138642 | A1* | 6/2010 | Cherian | G06F 9/4401 713/2 |
| 2014/0025816 | A1* | 1/2014 | Otani | G06F 9/5072 709/225 |
| 2014/0064283 | A1 | 3/2014 | Balus et al. | |
| 2015/0312802 | A1* | 10/2015 | Shah | H04W 24/02 370/235 |
| 2015/0317169 | A1* | 11/2015 | Sinha | H04L 49/254 713/2 |
| 2016/0253244 | A1* | 9/2016 | Zhang | G06F 11/1415 707/645 |
| 2016/0342439 | A1* | 11/2016 | Woerndle | H04L 61/2596 |

OTHER PUBLICATIONS

Intelligent Solution Choice for an Ever Complex World; Edge-corE. :Data Center Solution; http://edge-core.com/solution.asp; 4 pages.
VCE Unveils VxRACK: Industry's First Hyper-Converged Rackscale System Delivers Massive Scale-Out Infrastructure With Simplicity; http://india.emc.com/about/news/press/2015/20150504-05.htm; 3 pages.
Bare Meal Provisioning Configuration; http://www.force10networks.com/whitepapers/pdf/bare-metal-provisioning-configuration.pdf; 3 pages.
Intelligent Network Operating System for Data Centers; ; Aricent Group; 2014; 4 pages.
Vapor IO Launces Open MistOS to Disrupt Antiquated Top-Of-Rack Management Solutions; Dec. 11, 2015; http://www.vapor.io/vapor-io-launches-open-mistos/; 3 pages.
Self-Service Cloud Infrastructure for Dynamic IT Environments; Solidfire; 78 Pages.

* cited by examiner

PROVISIONING THE HYPER-CONVERGED INFRASTRUCTURE BARE METAL SYSTEMS FROM THE TOP OF THE RACK SWITCH

FIELD

Embodiments of the present invention generally relate to the field of hyper-converged systems. More specifically, embodiments of the present invention relate to systems and methods for provisioning hyper-converged systems.

BACKGROUND

A hyper-converged infrastructure is a rack-based system with a combination of compute, storage and networking components. Each rack includes multiple bare metal systems (e.g., nodes) with compute, storage and networking capabilities. The term "bare metal" refers to a computer system without an operating system (OS) installed. The bare metal systems are connected to a Top of the Rack (TOR) switch to access an external network. The number of bare metal systems in the rack can vary based on capacity requirements, which may change dynamically over time.

Existing hyper-converged infrastructures provision the bare metal systems by manually provisioning one of the bare metal systems. This bare metal system becomes a control node and is used to provision other bare metal systems in the rack. If the control node is removed from the rack, one of the other bare metal systems needs to be established as the control node. If all of the bare metal systems are replaced in the rack, the process must be restarted. Restarting the process in this way is a very time-consuming process. A more robust method, which does not depend on any individual bare metal system for provisioning the hyper-converged infrastructure bare metal systems, is needed.

SUMMARY

Methods and devices for provisioning a hyper-converged infrastructure of bare metal systems are disclosed herein. Two fabric elements are configured in a master-slave arrangement to ensure high availability. Open Network Install Environment (ONIE) capable fabric elements may be pre-installed with an operating system as firmware to run open network operating systems, such as Linux. The Linux operating system includes a Kernel-based Virtual Machine (KVM) hypervisor to run virtual machines. An operating system of the virtual machines can access an external network by creating a bridge between switch management ports and a virtual network interface. New node elements may be added by connecting the network ports of the new node element to the fabric elements and booting the new node element in a network/Preboot Execution Environment (PXE) boot mode. The new node element obtains an internet protocol (IP) address from a Dynamic Host Configuration Protocol (DHCP) server and boots an image downloaded from a PXE server.

According to one embodiment, a method for provisioning a node of a hyper-converged infrastructure is disclosed. The method includes booting the node of the hyper-converged infrastructure, where the node includes an Intelligent Platform Management Interface (IPMI) port and a switch management port, the IPMI port and the switch management port are coupled to a network switch, the hyper-converged infrastructure includes a fabric element with a virtual machine that executes a PXE and a DHCP server, and the PXE stores pre-built operating system images. The method further includes allocating an IP address to the node using the DHCP server of the virtual machine, downloading a first operating system image from the PXE of the virtual machine to the node, installing a first operating system to a local disk of the node using the first operating system image, and booting the node using the first operating system.

According to another embodiment, a device for provisioning a hyper-converged infrastructure is disclosed. The device includes a fabric element running a virtual machine and coupled to a network switch, and a node coupled to the fabric element, where the node includes an IPMI port and a switch management port, the IPMI port and the switch management port are coupled to the network switch, the virtual machine executes a PXE, and the PXE stores pre-built operating system images. The node downloads a first operating system image from the PXE of the virtual machine, installs a first operating system to a local disk of the node using the first operating system image, and boots using the first operating system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
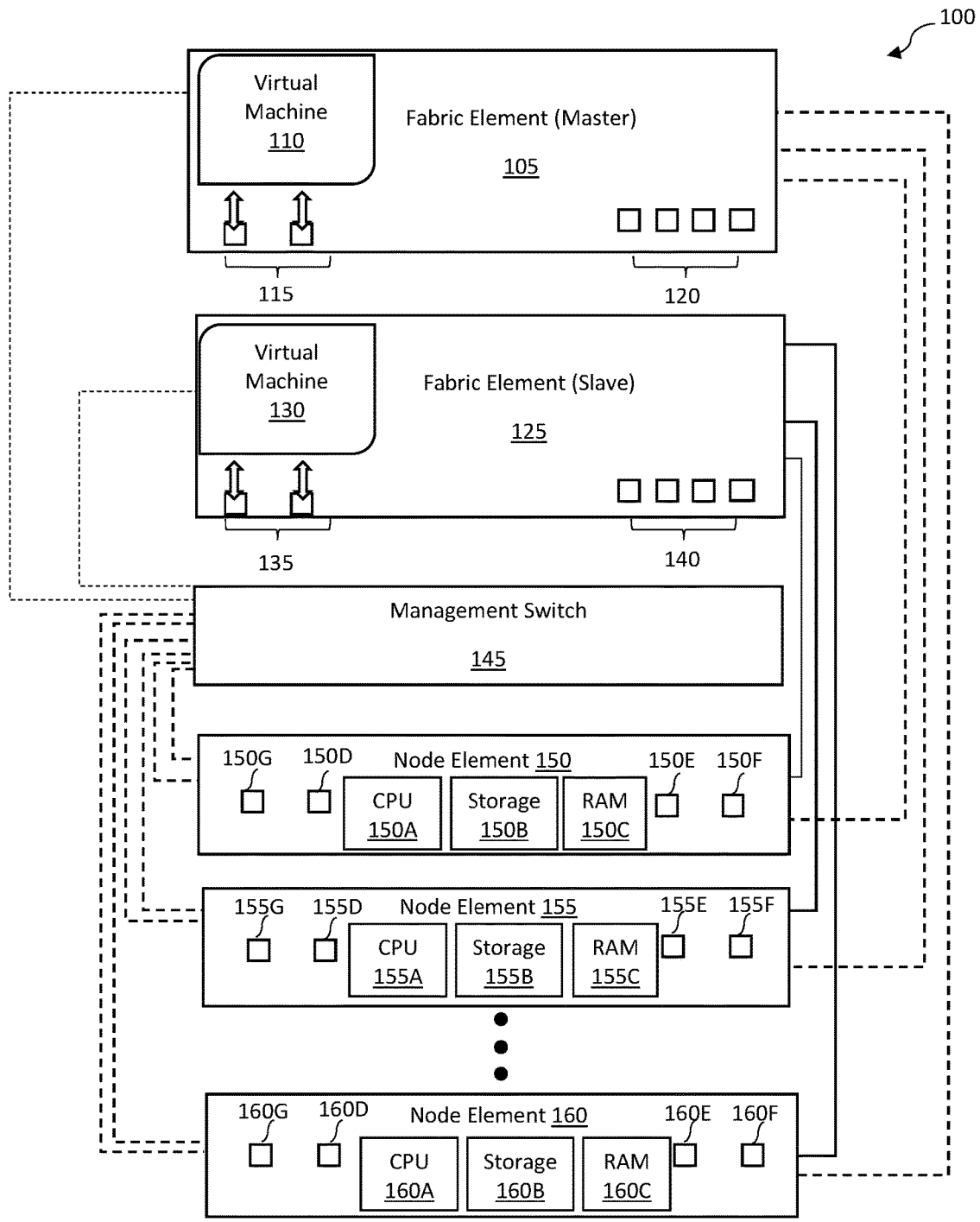
FIG. 1 is a block diagram of an exemplary device for provisioning bare metal systems of a hyper-converged infrastructure depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowcharts of the figures herein (e.g., FIGS. 4 and 5), and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Provisioning the Hyper-Converged Infrastructure Bare Metal Systems from the Top of the Rack Switch The following description is presented to enable a person skilled in the art to make and use the embodiments of this invention. It is presented in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The rack of a hyper-converged infrastructure includes at least one fabric element (e.g., a Top of the Rack switch) and at least one node element (e.g., a bare metal system). The fabric element provides connectivity to connect node elements to other node elements. A node element may include directly attached compute, network, and storage resources, for example. Node elements of a hyper-converged infrastructure include an Intelligent Platform Management Interface (IPMI) port, on board management network ports, and high speed data network ports. IPMI ports are used for controlling a board management controller (BMC) of the node element, which monitors the physical state of the node element along with providing power management services.

With regard to FIG. 1, an exemplary device 100 for provisioning bare metal systems of a hyper-converged infrastructure is depicted according to embodiments of the present invention. The device 100 includes an Open Network Install Environment (ONIE) capable fabric element (master) 105 and ONIE capable fabric element (slave) 125. The two fabric elements are configured in a master-slave arrangement to ensure high availability. The ONIE capable fabric elements may be pre-installed with an operating system as firmware to run open network operating systems, such as Linux. The Linux operating system includes a KVM hypervisor to run virtual machines (e.g., virtual machine 110 and 130) as a service on the respective fabric element. The fabric elements include switch management ports 115 and 135 (e.g., 1G ports) and high speed data ports 120 and 140. An operating system of the virtual machines 110 and 130 can access an external network by creating a bridge between switch management ports 115 and 135, respectively, and a virtual network interface.

The fabric elements 105 and 125 of FIG. 1 provide bootstrap mechanisms for the node elements using the respective virtual machine 110 or 130, and provide data network connectivity for transmitting data between the individual node elements 150, 155, and 160. Fewer or additional node elements may be included and coupled to a fabric element and a network management switch. When a fabric element provides bootstrap functionality for the node elements, the node elements are able to access a highly available data network using the dual fabric elements.

Virtual machines 110 and 130 of fabric elements 105 and 125, respectively, include an operating system for running a Preboot eXecution Environment (PXE) server and a Dynamic Host Configuration Protocol (DHCP) server used to bootstrap the node elements 150, 155, and 160. The PXE server is populated with pre-built operating system images to be installed or booted on the node elements 150, 155, and 160. The DHCP server is configured with an IP address range to be allocated to the node elements 150, 155, and 160.

The node elements include an IPMI port, an on-board management port, and high speed data ports. The IPMI ports 150D, 155D, and 160D and the on-board management ports 150G, 155G, and 160G of respective node elements 150, 155, and 160 are connected to management ports 115 or 135 of the fabric elements using network management switch 145. The high speed data ports of the node elements are connected directly to the high speed data ports of the fabric elements. For example, high speed data ports 150E, 155E, and 160E are connected to high speed data ports 120 of fabric element 105, and high speed data ports 150F, 155F, and 160F are connected to high speed data ports 140 of fabric element 125. The node elements further include a CPU for processing data and a storage element for storing local data. Node elements 150, 155, and 160 include CPU 150A, 155A, and 160A for processing data, storage 150B, 155B, and 160B for non-volatile data storage, and RAM 150C, 155C, and 160C for volatile data storage, respectively.

New node elements may be added to device 100 by connecting the network ports of the new node element to the fabric elements and booting the new node element in a network/PXE boot mode. The new node element obtains an IP address from a DHCP server and boots an image downloaded from a PXE server. The DHCP server and PXE server may be executed on virtual machine 110 and 130 of fabric elements 105 and 125, respectively. When all node elements of the rack are replaced, new node elements will be efficiently provisioned using the fabric elements.

Figure 2:
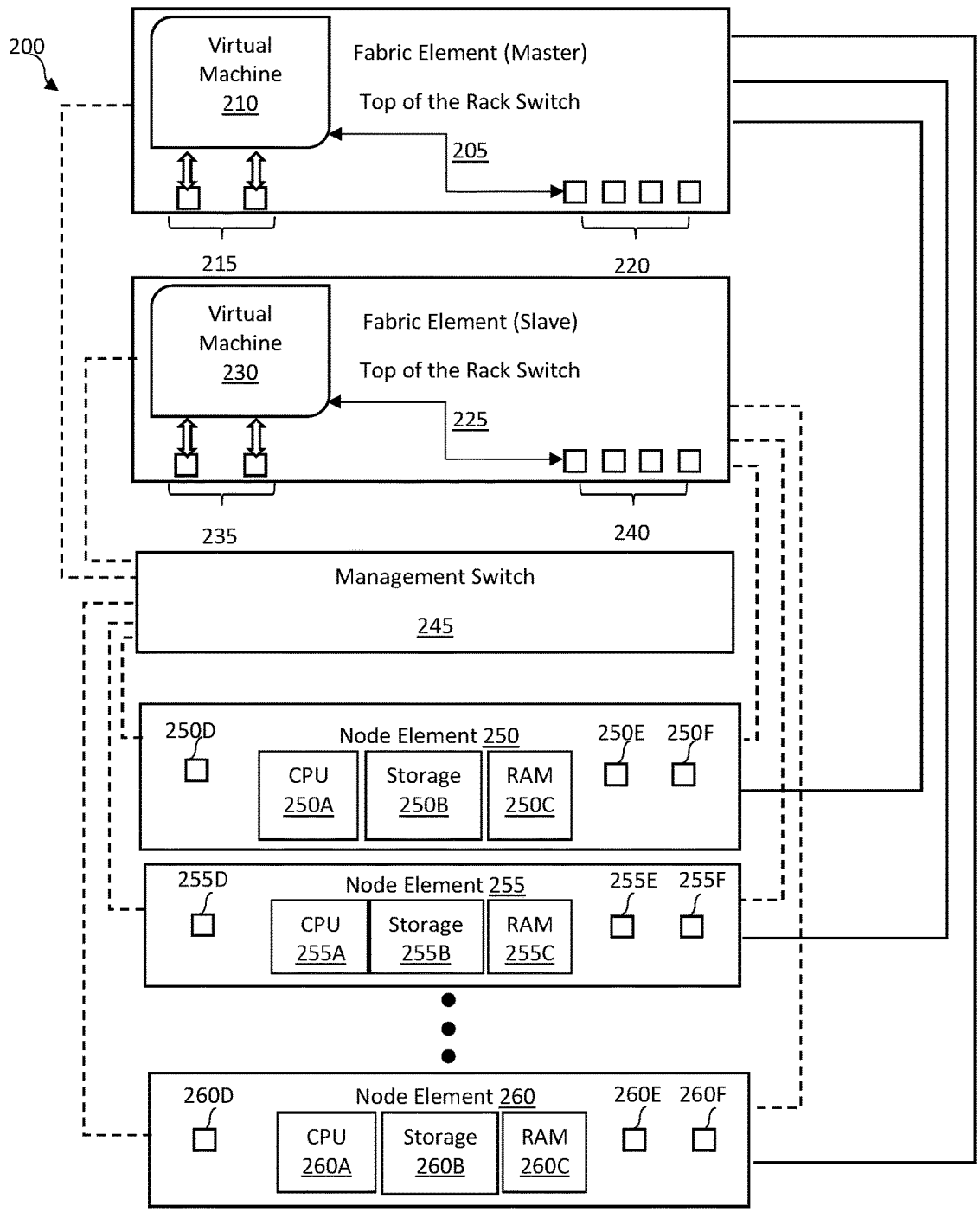
FIG. 2 is a block diagram of an exemplary device for provisioning bare metal systems of a hyper-converged infrastructure depicted according to embodiments of the present invention.

With regard to FIG. 2, an exemplary device 200 for provisioning bare metal systems of a hyper-converged infrastructure is depicted according to embodiments of the present invention. The device 200 includes an ONIE capable fabric element (Top of the Rack master switch) 205 and ONIE capable fabric element (Top of the Rack slave switch) 225. Device 200 further includes a network management switch 245, such as a 1G network switch, and a plurality of node elements 250, 255, and 260, although more or fewer node elements may be used. The node elements 250, 255, and 260 include an IPMI port, high speed data ports, a CPU for processing data, and local storage for storing data. The node elements do not include management ports, and the fabric elements 205 and 225 provision the node elements using high speed data ports 220 and 240, respectively. For example, high speed data ports 250E, 255E, and 260E are connected to high speed data ports 220 of fabric element 205, and high speed data ports 250F, 255F, and 260F are connected to high speed data ports 240 of fabric element 225, for provisioning the node elements. Node elements 250, 255, and 260 include CPUs 250A, 255A, and 260A for processing data, storage 250B, 255B, and 260B for non-volatile data storage, RAM 250C, 255C, and 260C for volatile data storage, and IPMI ports 250D, 255D, and 260D, respectively.

New node elements may be added to the rack of device 200 by connecting the network ports of the new node element to the fabric elements and booting the new node element in a network/PXE boot mode. The new node element obtains an IP address from a DHCP server and boots an image downloaded from a PXE server. The DHCP server and PXE server may be executed on virtual machine 210 and 230, for example. When all node elements of the rack are replaced, new node elements will be efficiently provisioned using the fabric elements.

Figure 3:
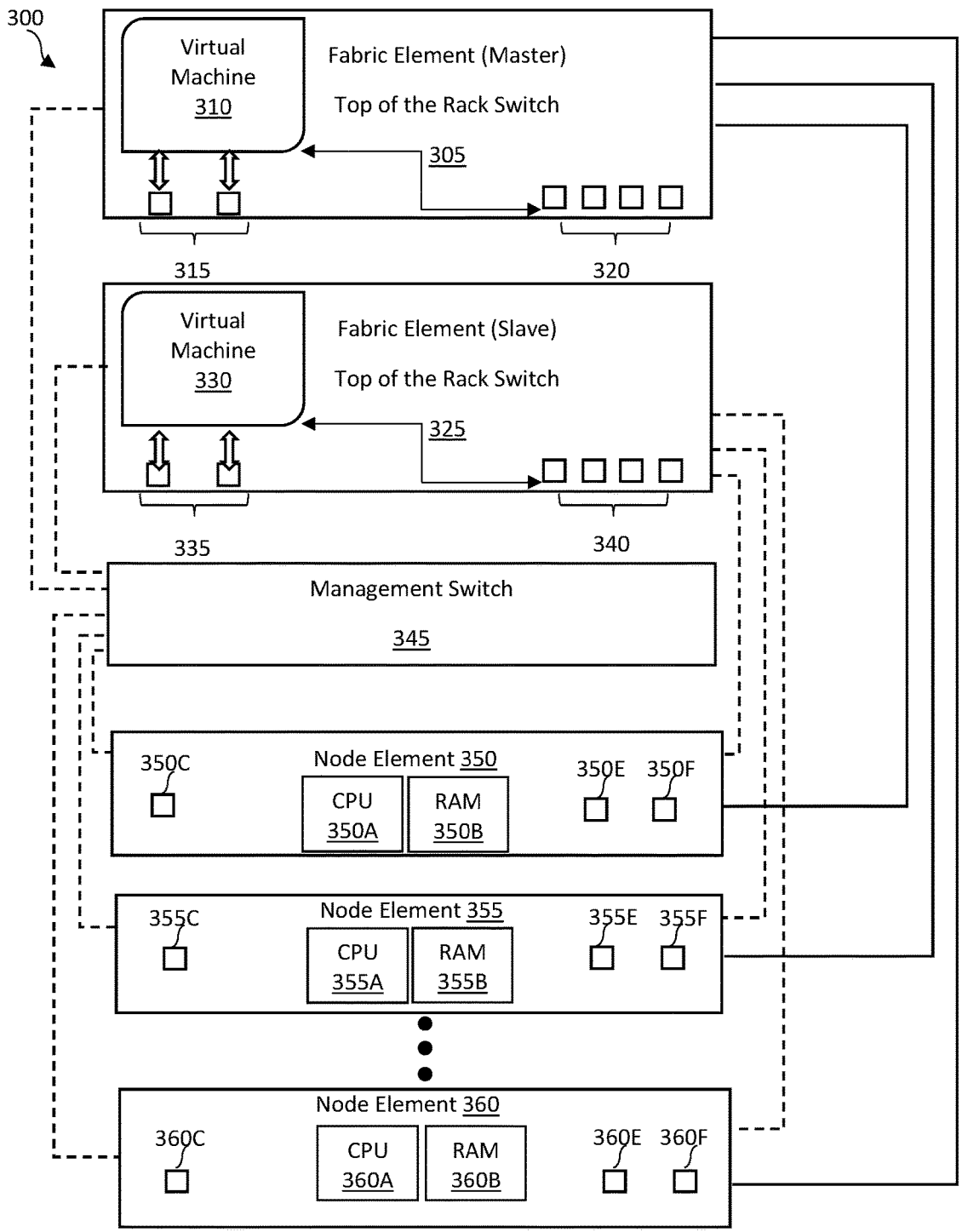
FIG. 3 is a block diagram of an exemplary device for provisioning stateless node elements of a hyper-converged infrastructure depicted according to embodiments of the present invention.

With regard to FIG. 3, an exemplary device 300 for provisioning bare metal systems of a hyper-converged infrastructure is depicted according to embodiments of the present invention, where the bare metal systems 350, 355, and 360 are stateless and do not include local storage. Node elements 350, 355, and 360 include CPUs 350A, 355A, and 360A and RAM 350B, 355B, and 360B, respectively. The node elements do not include any bootstrap software, and when a node element is initially powered up, the node element obtains bootstrap software from a fabric element 305 or 325. The node element stores the bootstrap software in main memory (RAM) and executes the software using a local CPU, instead of installing the bootstrap software to a local disk. In this case, each node element is identical until the node element is bootstrapped from a fabric element when the node element boots. Because the nodes are stateless, an entire rack may be transported or mounted in another location without retaining information. The node elements are provisioned by the fabric elements each time a node element boots.

Figure 4:
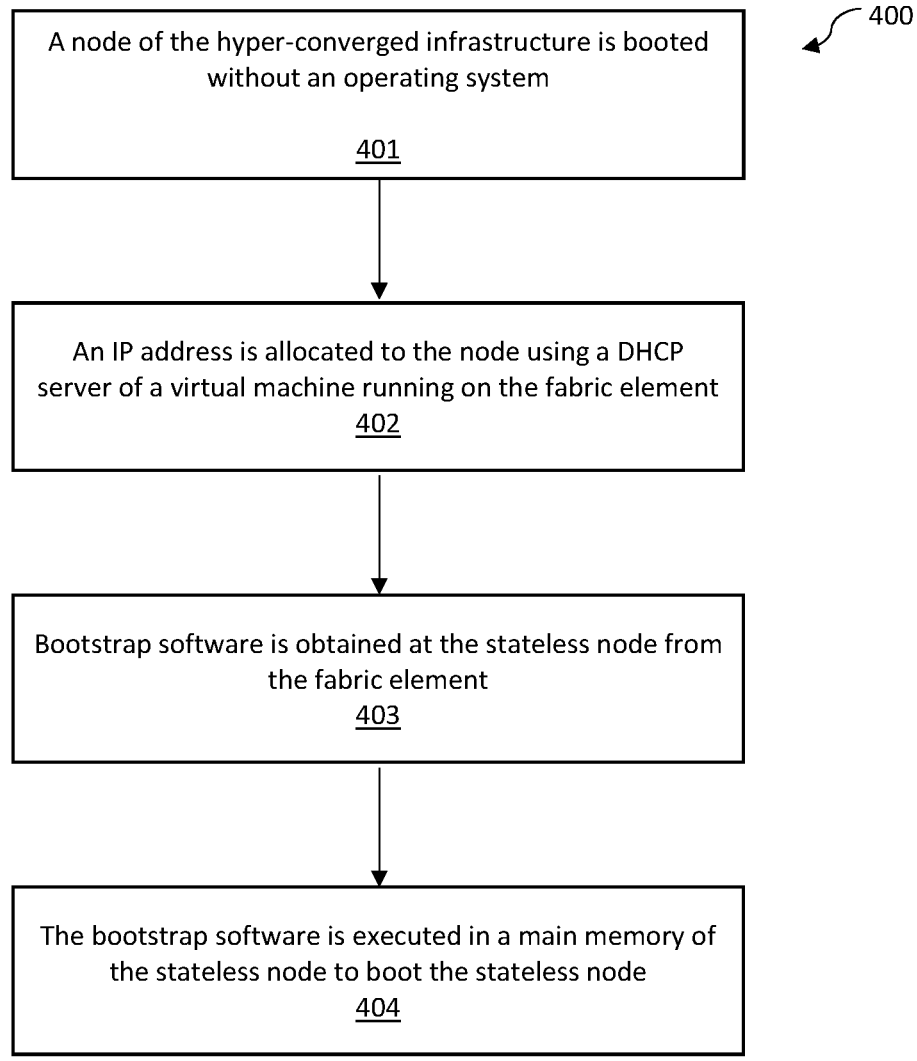
FIG. 4 is a flow chart depicting an exemplary sequence of computer implemented steps for performing a method of provisioning stateless nodes of a hyper-converged infrastructure according to embodiments of the present invention.

With regard to FIG. 4, a flow chart 400 of an exemplary sequence of computer implemented steps for provisioning stateless nodes of a hyper-converged infrastructure using a fabric element is depicted according to embodiments of the present invention. At step 401, a node of the hyper-converged infrastructure is booted without an operating system. According to some embodiments, the node is booted in a PXE or network boot mode. At step 402, an IP address is allocated to the node using a DHCP server of a virtual machine running on the fabric element. At step 403, bootstrap software is obtained at the stateless node from the fabric element. At step 404, the bootstrap software is executed in a main memory of the stateless node to boot the stateless node.

Figure 5:
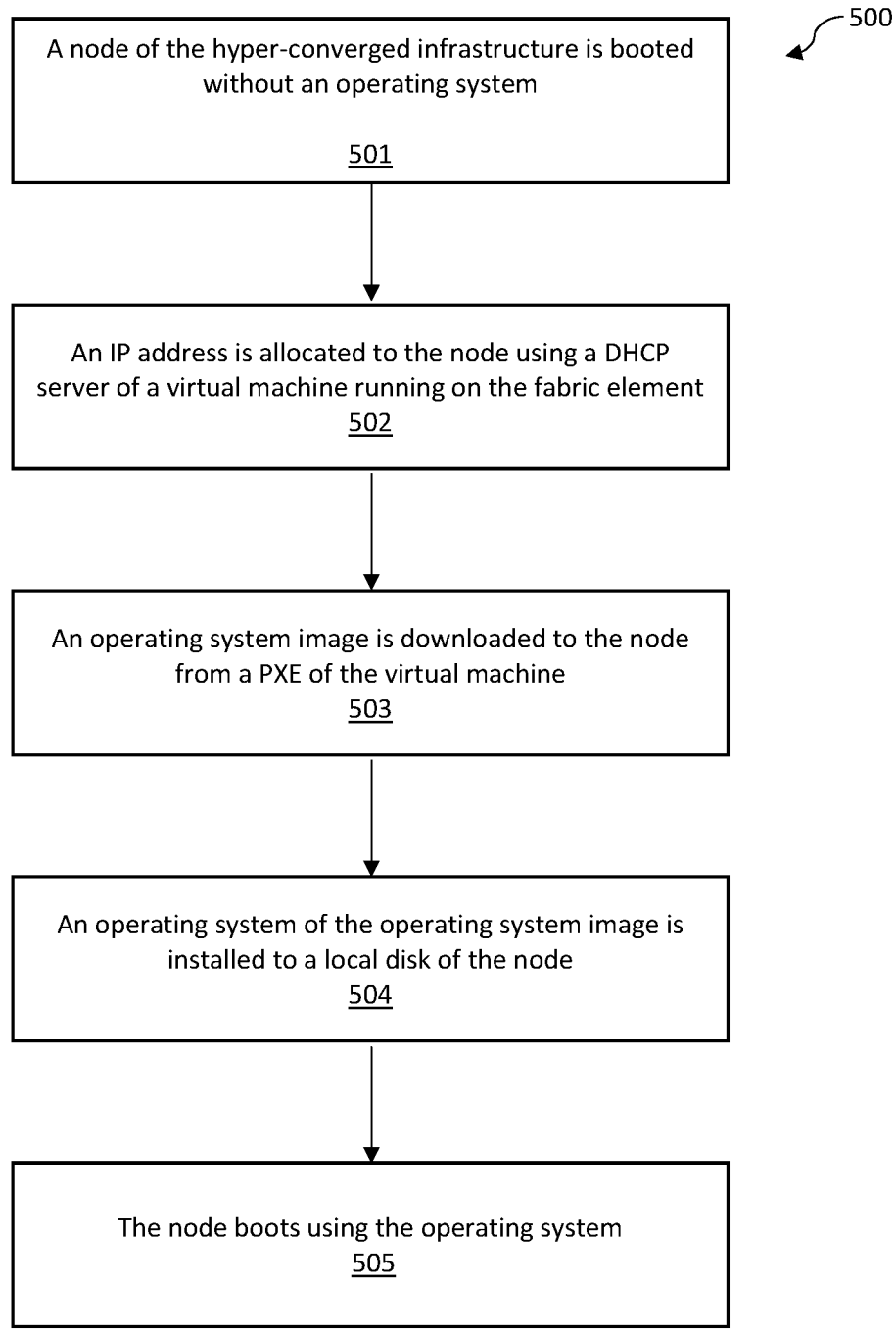
FIG. 5 is a flow chart depicting an exemplary sequence of computer implemented steps for performing a method of provisioning bare metal systems of a hyper-converged infrastructure according to embodiments of the present invention.

With regard to FIG. 5, a flow chart 500 of an exemplary sequence of computer implemented steps for provisioning a hyper-converged infrastructure using a fabric element is depicted according to embodiments of the present invention. At step 501, a node of the hyper-converged infrastructure is booted without an operating system. According to some embodiments, the node is booted in a PXE or network boot mode. At step 502, an IP address is allocated to the node using a DHCP server of a virtual machine running on the fabric element. At step 503, an operating system image is downloaded to the node from a PXE of the virtual machine. At step 504, an operating system of the operating system image is installed to a local disk of the node. At step 505, the node boots using the operating system.

Embodiments of the present invention are thus described. While the present invention has been described in particular embodiments, it should be appreciated that the present invention should not be construed as limited by such embodiments, but rather construed according to the following claims.

What is claimed is:

1. A method for provisioning a node of a hyper-converged infrastructure, the method comprising:
    booting the node without an operating system, wherein:
        the node comprises an Intelligent Platform Management Interface (IPMI) port and a switch management port;
        the IPMI port and the switch management port are coupled to a network switch and a fabric element in the hyper-converged infrastructure; and
        the fabric element provides data connectivity between the node and at least one other node element through a direct connection to a high speed data port of the node;
    allocating an internet protocol address to the node using a dynamic host configuration protocol (DHCP) server executed by a virtual machine, wherein:
        the virtual machine is hosted by the fabric element;
        the virtual machine executes a preboot execution environment (PXE); and
        the PXE stores pre-built operating system images;
    downloading an operating system image from the PXE of the virtual machine to the node;
    installing an operating system to a local disk of the node using the operating system image; and
    booting the node using the operating system.

2. The method of claim 1, wherein the fabric element is pre-installed with a second operating system as firmware configured to execute an open network operating system.

3. The method of claim 2, wherein:
the firmware is configured to execute a Linux operating system; and
the fabric element executes a kernel-based virtual machine hypervisor using the virtual machine.

4. The method of claim 2, wherein:
the fabric element is configured as a master fabric element;
the hyper-converged infrastructure further comprises a second fabric element configured as a slave fabric element; and
the fabric element and the second fabric element interoperate to improve availability of the hyper-converged infrastructure.

5. The method of claim 1, wherein the switch management port is a 1G port.

6. The method of claim 1, further comprising configuring the DHCP server with a range of IP addresses for allocation.

7. The method of claim 1, wherein the fabric element is a top of the rack switch that controls a board management controller of the node using the IPMI port.

8. The method of claim 1, further comprising accessing an external network by creating a bridge between the switch management port and a virtual network interface of the virtual machine.

9. A system comprising:
a stateless node of a hyper-converged infrastructure;
means for booting the stateless node without an operating system, wherein:
   the stateless node comprises a main memory and an Intelligent Platform Management Interface (IPMI) port coupled to a network switch and a fabric element in the hyper-converged infrastructure; and
   the fabric element is configured to provide connectivity between the node and at least one other node element through a direct connection to a high speed data port of the node; and
means for allocating an internet protocol address to the stateless node using a dynamic host configuration protocol (DHCP) server executed by a virtual machine, wherein:
   the virtual machine is hosted by the fabric element;
   the virtual machine is configured to execute a preboot execution environment (PXE); and
   the PXE stores pre-built operating system images;
means for obtaining bootstrap software at the stateless node from the fabric element; and
means for executing the bootstrap software in the main memory to boot the stateless node.

10. The system of claim 9, wherein:
the fabric element is configured as a master fabric element;
the hyper-converged infrastructure further comprises a second fabric element configured as a slave fabric element; and
the fabric element and the second fabric element are configured to interoperate to improve availability of the hyper-converged infrastructure.

11. The system of claim 9, wherein:
the stateless node further comprises a switch management port coupled to the network switch; and
the switch management port is a 1G port.

12. The system of claim 9, further comprising means for configuring the DHCP server with a range of IP addresses for allocation.

13. The system of claim 9, wherein the fabric element is a top of the rack switch that is configured to control a board management controller of the stateless node using the IPMI port.

14. The system of claim 9, further comprising means for accessing an external network by creating a bridge between a switch management port of the stateless node and a virtual network interface of the virtual machine.

15. A device for provisioning a hyper-converged infrastructure, the device comprising:
a fabric element configured to run a virtual machine and coupled to a network switch, wherein:
   the fabric element is configured to provide connectivity among a plurality of nodes through a direct connection to high speed data ports of the plurality of nodes;
   the virtual machine is configured to execute a preboot execution environment (PXE); and
   the PXE is configured to store pre-built operating system images; and
a node, from among the plurality of nodes, coupled to the fabric element, wherein the node comprises an Intelligent Platform Management Interface (IPMI) port and a switch management port, the IPMI port and the switch management port are configured to be coupled to the network switch, and the node is configured to:
   download an operating system image from the PXE of the virtual machine;
   install an operating system to a local disk of the node using the operating system image; and
   boot using the operating system.

16. The device of claim 15, wherein the fabric element and the node comprise high speed data ports for coupling the fabric element to the node.

17. The device of claim 15, wherein:
the virtual machine is configured to execute a dynamic host configuration protocol (DHCP) server; and
the node is further configured to obtain an internet protocol address from the DHCP server.

18. The device of claim 15, wherein the fabric element is configured as a master fabric element, and further comprising a second fabric element configured as a slave fabric element and configured to be coupled to the network switch and the node, wherein the fabric element and the second fabric element are configured to interoperate to improve availability of the hyper-converged infrastructure.

19. The device of claim 15, wherein the fabric element is pre-installed with a second operating system as firmware configured to execute an open network operating system.

20. The device of claim 19, wherein:
the firmware is configured to execute a Linux operating system; and
the fabric element is configured to execute a kernel-based virtual machine hypervisor using the virtual machine.

* * * * *